United States Patent [19]

Willat

[11] Patent Number: 4,630,843

[45] Date of Patent: Dec. 23, 1986

[54] BINDER

[75] Inventor: Boyd Willat, Los Angeles, Calif.

[73] Assignee: Harper House, Inc., Los Angeles, Calif.

[21] Appl. No.: 555,628

[22] Filed: Nov. 28, 1983

Related U.S. Application Data

[63] Continuation-in-part of Ser. No. 427,559, Sep. 27, 1982, abandoned.

[51] Int. Cl.[4] .......................... B42D 3/06; B42D 3/12; B32B 31/00; F16C 11/00

[52] U.S. Cl. .......................................... 281/30; 281/31; 156/292; 402/75

[58] Field of Search ........................ 281/30, 31, 35, 36, 281/29; 283/82, 83, 70; 156/292, 309.6, 219, 308.4; 402/75

[56] References Cited

U.S. PATENT DOCUMENTS

| | | | |
|---|---|---|---|
| 2,066,992 | 1/1937 | Matson | 281/30 |
| 2,478,132 | 8/1949 | Schade | 156/292 |
| 2,738,297 | 3/1956 | Pfistershammer | 156/292 |
| 2,788,041 | 4/1957 | Carver | 281/29 |
| 3,267,980 | 8/1966 | Bird | 281/30 |
| 3,282,764 | 11/1966 | Goettsch | 156/292 |
| 4,174,909 | 11/1979 | Jahn | 402/75 |
| 4,212,692 | 7/1980 | Rasen et al. | 156/292 |
| 4,296,945 | 10/1981 | Pavlik | 281/31 |
| 4,305,502 | 12/1981 | Gregory | 156/292 |

FOREIGN PATENT DOCUMENTS

| | | | |
|---|---|---|---|
| 851492 | 8/1952 | Fed. Rep. of Germany | 281/42 |
| 12523 | of 1896 | United Kingdom | 281/30 |

*Primary Examiner*—Paul A. Bell
*Assistant Examiner*—Paul M. Heyrana, Sr.
*Attorney, Agent, or Firm*—Pretty, Schroeder, Brueggemann & Clark

[57] ABSTRACT

A durable binder for holding papers and the like includes exterior and interior cover sheets that are attached to each other by heat sealing to define relatively rigid panels separated by hinge panels. The hinge panels are each characterized by a multitude of minute separate depressed areas in which the cover sheets are connected, the depressed areas being surrounded by intersecting raised areas. The depressed areas can be of varying depth and can define pockets for holding writing instruments and other objects.

23 Claims, 10 Drawing Figures

FIG. 4
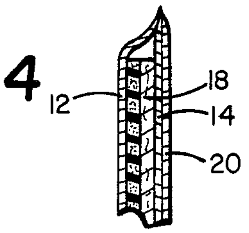
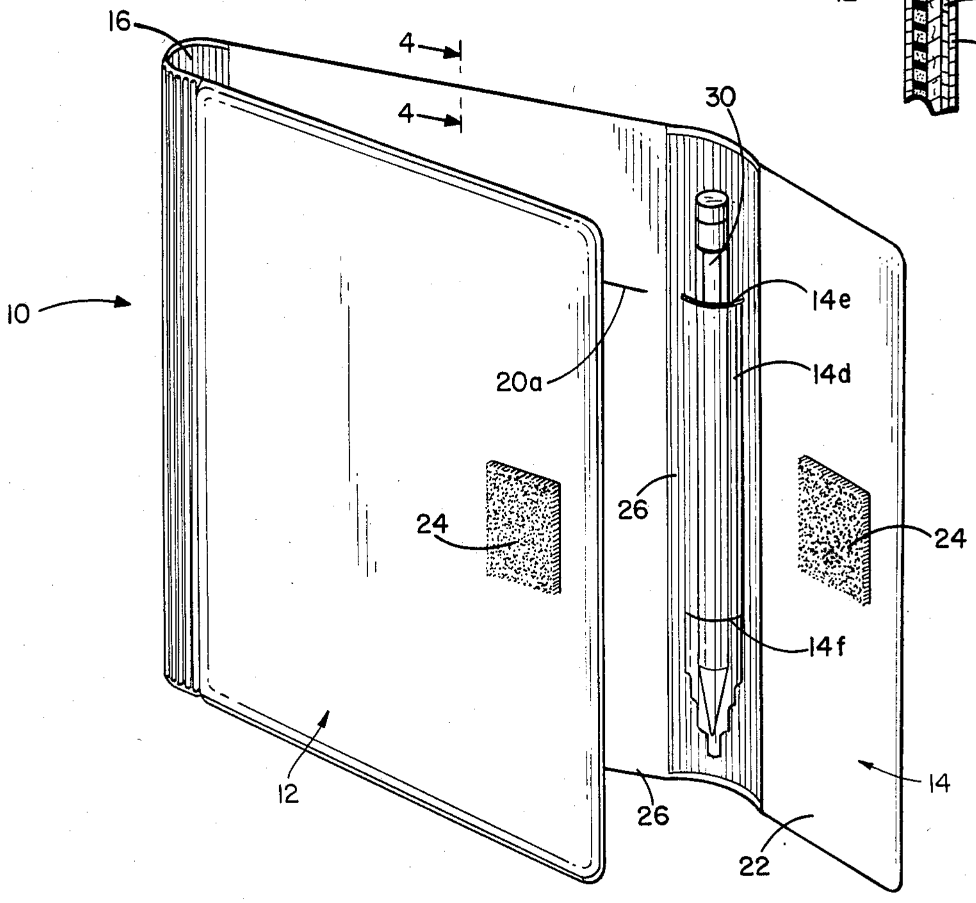
FIG. 1
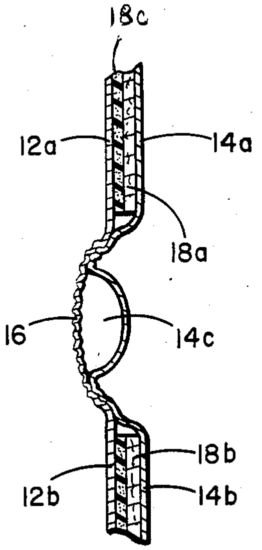
FIG. 3
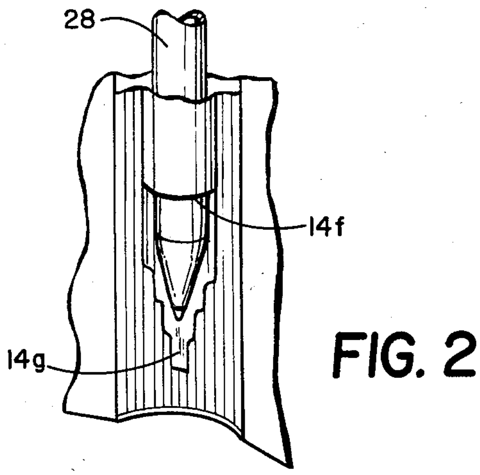
FIG. 2

BINDER

CROSS-REFERENCE TO RELATED APPLICATION

This is a continuation-in-part of U.S. application Ser. No. 427,559, entitled Binder, filed on Sept. 27, 1982, now abandoned.

BACKGROUND OF THE INVENTION

The present invention relates to binders and more particularly to plastic binders for holding notes, price lists, and other written materials.

Binders, which are commonly used in business and education, often have operable rings for holding pages and sometimes include pockets for holding writing instruments and other objects. A typical binder includes interior and exterior vinyl cover sheets joined by heat sealing. Cardboard stiffening sheets between the cover sheets can impart some rigidity and plastic foam padding can be included as well.

Generally, the binder includes front and back cover panels separated by one or more hinged panels and, in some cases, a relatively rigid spine panel. A pliable closure panel that extends from one of the cover panels can also be included. Usually the cover sheets are fused together by heat sealing along the periphery of the binder. Some binders are provided with an additional transparent plastic pocket sheet that is heat sealed to the interior cover sheet. Pockets, such as sleeves for writing instruments and the like, can be formed by this additional sheet.

Heat sealing is performed using an electrostatic die. A conventional die is provided with electrically heated brass bars or projections so arranged that they contact the portions of the vinyl sheets to be heat sealed. Excess material extending from the fused edges is torn off, forming a "tear seal".

Conventional vinyl binders are provided with heat sealed strips extending along hinge areas and closure flaps to impart flexibility so that the binder can be easily opened or closed. The heat sealing process causes the melted plastic to flow, leaving thinner material in the heat sealed areas. Thus, the binder tends to fold and ultimately crack in these heat sealed areas. Often the area in which folding takes place as a binder is opened and closed is no more than ⅛ of an inch wide.

It is sometimes found that heat sealed strips along the spine of the binder that permit sufficient flexibility also permit the cover panels to "wobble" in relation to the spine. Another drawback of conventional binders is that the provision for holding a writing instrument is often unsatisfactory because thin pens and pencils tend to fall out. Also a loop provided for the purpose of holding a writing instrument will somes times interfere when opening or closing the binder. The formation of these loops often requires an additional manufacturing step.

SUMMARY OF THE INVENTION

The present invention, which greatly improves upon conventional binders, employs an exterior cover sheet and an overlying interior cover sheet that are foldable together to define rigid panels separated by at least one flexible hinge panel. The hinge panel is characterized by a multitude of minute separated depressed areas in which the cover sheets are connected by heat sealing. The depressed areas, which may be of varying depths and may be of a repeating geometric configuration, are surrounded by intersecting raised areas. Means are provided for releasably retaining pages between the panels.

The panels include front and back cover panels and, if desired, a spine panel. A closure panel that extends from the back cover panel and fastens to the front cover panel may also be provided, and depressed areas, as described above, can be included in the cover panel for added flexibility.

Pockets or sleeves can be included to hold writing instruments and other objects. A pocket sheet, which may be translucent, can overly the interior cover sheet, being connected to by heat sealing. The pocket sheet can then be used to form the pockets. These pockets can be defined by the depressed areas.

A pocket can be in the form of a sleeve can be in the shape of a writing instrument. The sleeve may have a transverse slit adjacent its lower most portion to define a separate compartment to receive the pointed end of a writing instrument.

Other features and advantages of the present invention will become apparent from the following detailed description, taken in conjunction with the accompanying drawings, which illustrate, by way of example, the principles of the invention.

BRIEF DESCRIPTION OF THE DRAWINGS

FIG. 1 is a three-dimensional perspective view of a binder constructed in accordance with the present invetion;

FIG. 2 is an enlarged fragmentary perspective view of a portion of the binder of FIG. 1, showing a portion of a sleeve for receiving a writing instrument;

FIG. 3 is a fragmentary cross-sectional view of the center portion of another binder constructed in accordance with the present invention;

FIG. 4 is a cross-sectional view of a fragmentary portion of an edge portion of still another binder constructed in accordance with the invention;

DESCRIPTION OF THE PREFERRED EMBODIMENTS

Figure 5:
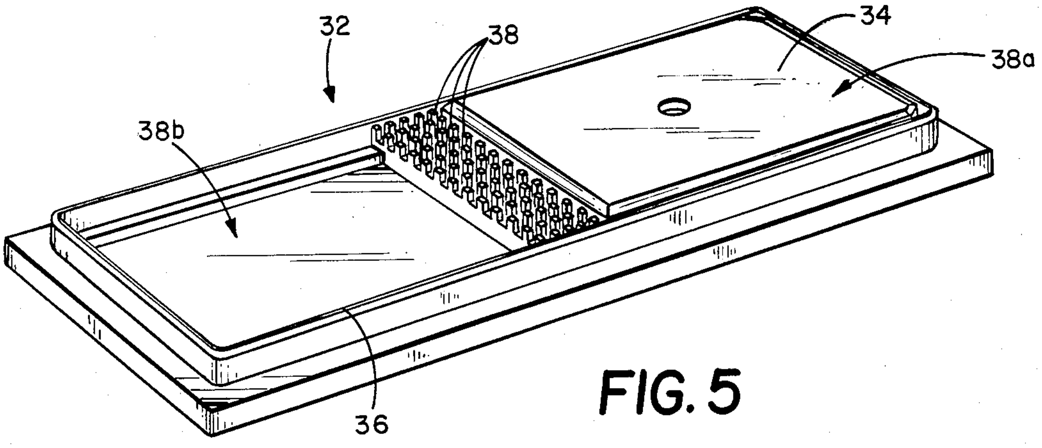
FIG. 5 is a three-dimensional perspective view of an electrostatic die that can be used to manufacture binders in accordance with the invention.

A binder 10, shown in FIG. 1, includes an exterior cover sheet 12, made up of portions 12*a* and 12*b*, as best shown in the cross-sectional view of FIG. 3. An interior cover sheet 14, having portions 14*a* and 14*b*, overlies the exterior cover sheet 12, and the two cover sheets are separated by intermediate cardboard stiffening sheets 18*a* and 18*b*. Foam rubber padding 18*c* is provided between the stiffening sheets 18*a* and 18*b* and the corresponding portions 12*a* and 12*b* of the exterior cover sheet. The edges of the cover sheets 12 and 14 are joined by heat sealing.

A translucent plastic sheet 20 may be superimposed and overlay the interior cover sheet 14, as best shown in FIG. 4, and is heat sealed simultaneously with the cover sheets 12 and 14 when the binder 10 is formed. It is heat sealed along an elongated section of the interior cover sheet 14 to form a sleeve or pocket 14c for holding a writing instrument, as shown in FIG. 3. Alternatively, the pocket can be formed by leaving a portion of the pocket sheet 20 unsealed. It similarly forms a pocket for holding pages, accessible by a slit 20a and the pocket sheet 20.

The sleeve 14c may be formed in the interior of the binder 10 in any appropriate portion thereof. As shown in FIG. 1, an exemplary elongated sleeve 14d extends parallel to the spine 16 of the binder 10 and retains a writing instrument 30. Accordingly, the sleeve 14c or 14d may be disposed within the spine portion 16, as shown in FIG. 3, or within the area where the back cover of the binder 10 meets a closure panel 22. When the binder is closed, the closure panel 22 is attached to the exterior cover sheet 12 of the front cover of the binder 10 by a Velcro fastener 22.

Heat sealed seams, generally indicated as 26 in FIG. 1, fuse the cover sheets 12 and 14 together and form the wide pocket 20 and the sleeve 14c or 14d. The stiffening sheets 18a and *b* do not extend into the areas of the spine 16 or the flap 22, both of which must be bendable so that the binder 10 can be closed.

At the bottom end of the sleeve 14d is an opening or slit 14f, below which is a tip grip compartment of the sleeve, as shown in FIG. 2. Thus, a ball point pen 28 can be inserted in the sleeve 14d so that it overlies but does not enter the tip grip compartment 14g, which remains flat and unopened. Alternatively, however, a thin wooden lead pencil 30, which may not fit snugly within the sleeve 14d, can be inserted through the opening 14e and pushed downwardly into the compartment 14g, bypassing the lower slit 14f, thus positively preventing the pencil from sliding out of the sleeve until pulled out by the user. It is helpful in inserting the pencil 30 into the compartment 14g to apply a slight upward pressure on the exterior cover sheet 12 underneath the compartment 14g, thereby forcing the slit 14f to open.

Figure 6:
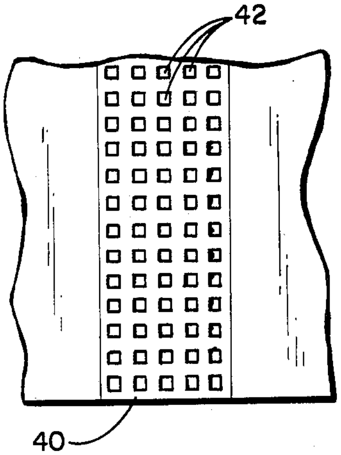
FIG. 6 is a fragmentary plan view of a portion of a binder formed by the die of FIG. 5.
Figure 7:
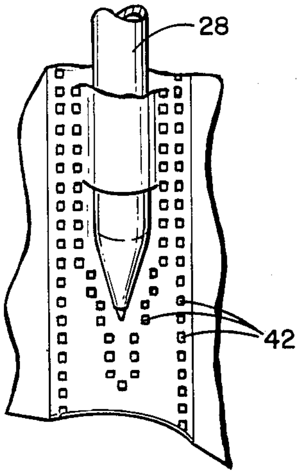
FIG. 7 is a fragmentary plan view of a portion of a binder, including part of a sleeve for holding a writing instrument in accordance with the present invention.

The heat sealing process used in manufacturing a binder in accordance with the present invention may be performed with the aid of an electrostatic die 32, shown in FIG. 5. The die 32 is substantially in the shape of an open binder, with die sections 38, 38a and 38b corresponding to the spine and cover panels of the binder, respectively. Within the cover sections 38a and 38b of the die 32 are resiliently mounted pressure plates 34 to force out air from between the binder sheets (only one exemplary pressure plate being shown in FIG. 5). The die 32 also includes brass bars 36 that extend along its perimeter, forming tear seal edges that contract and fuse the edges of the binder, while simultaneously heat sealing the spine portion 40 (FIG. 6) and any other portions of the binder that require heat sealing. The die 32 can be mounted on the heat sealing equipment (not shown) in a face-down position, with the bars 36 projecting vertically toward the vinyl.

The spine 40 of the binder is impressed, during heat sealing, with a multitude of minute heat sealing impressions 42 of repeating geometric configuration. The heat sealed impressions 42 are produced by corresponding projections or metal dots 38 that form part of the die 32. One may devise any desired configuration for the impressions, such as circles, ovals, etc. The impressions 38 could be also square, resulting in a more durable binder. The impressions or depressed areas 42 are spaced apart and separated by raised unsealed areas that form intersecting horizontal and vertical lines.

The heat sealing process causes a thinning of the binder material and there is, therefore, a risk of tearing or cracking in the spine 40 or any other portion of the binder subjected to massive heat sealing within a narrow area. This risk is reduced, however, due to the numerous unsealed areas that criss-cross the heat sealed areas, these unsealed areas imparting diagonal strength to the binder.

Figure 8:
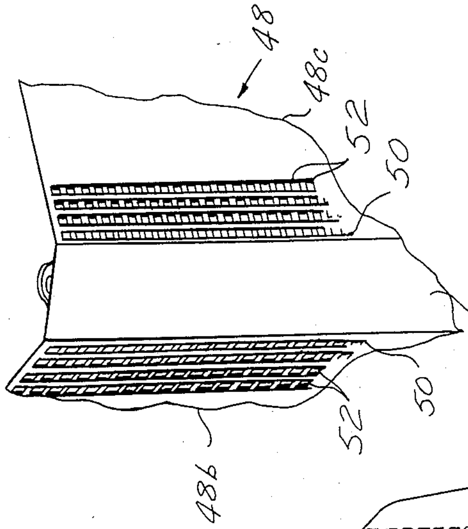
FIG. 8 is a fragmentary perspective exterior view of a portion of a binder constructed in accordance with the invention.

Another binder 48, shown in FIG. 8 and embodying the invention, includes rectangular heat sealed impressions having varying depths. Rows of relatively shallow impressions 56 are immediately adjacent to the borders between the spine panel 48a and the cover panels 48b and 48c of the binder. Rows of deeper, but not necessarily uniformly deeper, impressions 52 are situated farther away from the spine panel 48a. The area of the impressions 50 and 52 forms hinges between the spine panel 48a and the cover panels 48b and 48c. The hinges are more flexible in the areas of the shallow impressions 50, because less vinyl material is melted in these areas during the sealing process, and squeezed in the direction opposite to the thrust of the die. This creates less rigid areas surrounding the shallow impressions 50. It is therefore desirable to form one or more rows of shallow impressions 50 adjacent the spine panel 48a to create the desired flexible hinge effect. The impressions 52 that are at a greater distance from the spine panel 48a provide diagonal bracing, thus increasing the firmness of the binder and preventing sideways or transverse movement of the cover panels 48b and *c* relative to the spine panel 48a.

The hinge effect of the rectangular impressions 50 provides a binder that is so flexible that one may fold the cover panels 48b and *c* back to back. The great flexibility of the hinge panel having the impressions 50 is such that the holding of pens in this area does not interfere with the hinging action. Moreover, the binder is sufficiently expandable to wrap around a thick stack of papers without damage.

The depth of the shallow impressions 50 and 52 is minute, for example, about 32 mil, while the depth of the deeper impressions 52 may be 38 mils. The total depth of an exemplary three layer binder 48 is about 46 mils.

Figure 9:
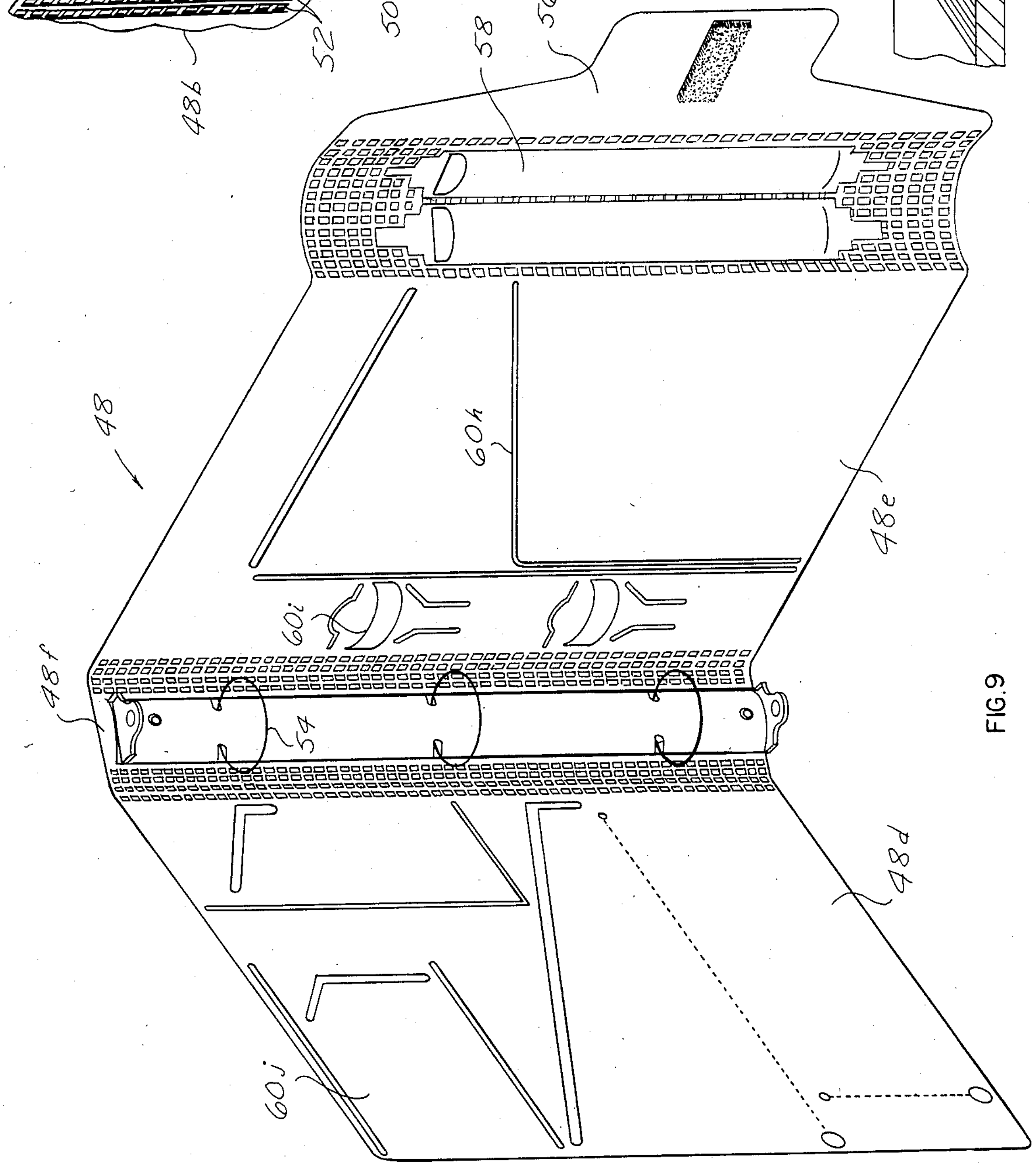
FIG. 9 is a three-dimensional, interior, perspective view of another binder constructed in accordance with the invention.

The binder 48, the interior of which is shown in FIG. 9, includes front and back cover panels 48d and 48e, respectively, separated by a spine panel 48f. Hole-punched paper fillers are normally inserted between the covers 48d and 48e and releasably held by metal rings 54. A closure panel 56 holds at least one pen (not shown) in a pocket 58 formed and defined by heat sealing. Pockets and sleeves 60h, *i* and *j* (and other unnumbered configurations) are formed within the binder 48, conforming to the shape of various objects such as calculators, keys, cards, and the like to be inserted therein.

Figure 10:
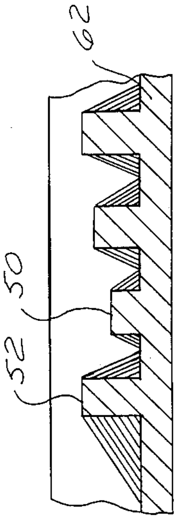
FIG. 10 is an enlarged schematic illustration showing the projections of a die and the impressions formed thereby in accordance with the present invention.

A die 52, shown in FIG. 10, is suitable for making impressions by heat sealing in accordance with the invention. The hatched areas around the projections 50 and 52 indicate the difference in the mass of melted vinyl pressed downwardly around the impressions during the heat sealing process, these areas having more or less rigidity depending on the depth of the impressions.

While particular forms of the invention have been illustrated and described, it will be apparent that various modifications can be made without departing from the spirit and scope of the invention.

What is claimed is:

1. A durable binder for holding papers and the like, said binder comprising:

an exterior plastic cover sheet;

an interior plastic cover sheet overlying said exterior cover sheet, said cover sheets being attached to each other along their respective peripheries and being foldable together to define relatively rigid panels separated by at least one flexible hinge panel, said hinge panel being characterized by a multitude of minute separated depressed areas in which said cover sheets are connected, said depressed areas being surrounded by intersecting raised areas, said cover sheets being connected by heat sealing in said depressed areas; and means for releasably retaining said pages between said panels.

2. The binder of claim 1 wherein:

said panels comprise a front panel, a back panel and a spine panel; and there are at least two of said hinge panels, each of which separates said spine panel from said front panel or said back panel.

3. The binder of claim 2 further comprising a flexible closure panel defined by said cover sheets, at least a portion of said closure panel being characterized by a multitude of minute separated depressed areas in which said cover sheets connected, said depressed areas being surrounded by intersecting raised areas, said cover sheets being joined by heat sealing in said depressed areas.

4. The binder of claim 3 wherein said closure panel extends from said back panel, said binder further comprising securement means for releasably securing said closure panel to said front panel.

5. The binder of claim 1 wherein said depressed areas are of varying depth.

6. The binder of claim 1 further comprising a stiffening sheet disposed between said cover sheets.

7. The binder of claim 1 further comprising a pocket sheet overlying said interior cover sheet and attached to said interior cover sheet along its periphery and in said depressed areas, said pocket sheet having at least one opening therein to provide access to a pocket defined between said pocket sheet and said interior cover sheet.

8. The binder of claim 1 wherein said depressed areas are geometric and form a repeating pattern.

9. A durable binder comprising:

an exterior plastic cover sheet;

an interior plastic cover sheet overlying at least a portion of said exterior cover sheet, said cover sheets being attached to each other along their respective peripheries and being foldable together to define relatively rigid front, back and spine panels, and flexible hinge panels separating said spine panel from said front and back panels, said hinge panels being characterized by a multitude of minute separated depressed areas in which said sheets are connected, said depressed areas being of varying depth and shallowest nearest said spine panels, said depressed areas being surrounded by intersecting raised areas, said cover sheets being connected by heat sealing in said depressed areas; and means for releasably retaining said pages between said front and back panels.

10. The binder of claim 9 wherein said depressed areas are geometric and form a repeating pattern.

11. The binder of claim 9 further comprising a flexible closure panel defined by said cover sheets, at least a portion of said closure panel being characterized by a multitude of minute separated depressed areas in which said cover sheets are connected, said depressed areas being surrounded by intersecting raised areas, said cover sheets being connected by heat sealing in said depressed areas.

12. The binder of claim 11 wherein said depressed areas of said hinge panels and said closure panels form a repeating geometric pattern.

13. The binder of claim 9 further comprising a stiffening sheet disposed between said cover sheets.

14. The binder of claim 9 further comprising a pocket sheet overlying said interior cover sheet and attached to said interior cover sheet along its periphery and in said depressed areas, said pocket sheet having at least one opening therein to provides access to a pocket defined between said pocket sheet and said interior cover sheet.

15. A durable binder comprising:

an exterior plastic cover sheet;

an interior plastic cover sheet overlying at least a portion of said exterior cover sheet, said cover sheets being attached to each other along their respective peripheries and being foldable together to define relatively rigid front, back and spine panels, and flexible hinge panels separating said spine panel from said front and back panels, said hinge panels being characterized by a multitude of minute separate depressed areas in which said cover sheets are connected, said depressed areas being surrounded by intersecting raised areas, said cover sheets being connected by heat sealing in said depressed areas;

a sleeve defined by said depressed areas for retaining a writing instrument; and means for releasably retaining said pages between said front and back panels.

16. The binder of claim 15 further comprising a pocket sheet attached to said interior cover sheet in said depressed areas, said sleeve being formed between said interior cover sheet and said pocket sheet.

17. The binder of claim 15 wherein said sleeve is in the shape of a writing instrument and includes a transverse slit adjacent its lower most portion, said slit defining a separate compartment therebelow to receive a pointed end of said writing instrument.

18. A double binder comprising:

an exterior plastic cover sehet;

an interior plastic cover sheet overlying at least a portion of said exterior cover sheet, said cover sheets being attached to each other along their respective peripheries and being foldable together to define relatively rigid front, back and spine panels, flexible hinge panels separating said spine panel form said front and back panels, a closure panel extending from said back panel, at least a portion of said hinge panels and a portion of said closure panel being characterized by a multitude of minute separated depressed areas in which said sheets are connected, said depressed areas being surrounded by intersecting raised areas, said cover sheets being connected by heat sealing in said depressed areas;

a sleeve in the shape of a writing instrument defined by said depressed areas and having an opening in the area of said closure panel for the insertion of said writing instrument in said sleeve; and means for releasably retaining said pages between said front and back panels.

19. The binder of claim 18 further comprising a pocket sheet attached to said interior cover sheet in said depressed areas, said sleeve being formed between said interior cover sheet and said pocket sheet.

20. The binder of claim 18 wherein said sleeve is in the shape of a writing instrument and includes a transverse slit adjacent its lower most portion, said slit defining a separate compartment therebelow to receive a pointed end of said writing instrument.

21. A durable binder comprising:

an exterior plastic cover sheet;

an interior plastic cover sheet overlying at least a portion of said exterior cover sheet, said cover sheets being attached to each other and being foldable together to define relatively rigid panels separated by at least one flexible hinge panel, said hinge panel being characterized by a multitude of minute separated depressed areas in which said cover sheets are connected, said depressed areas being surrounded by intersecting raised areas; and means for releasably retaining said paper between said panels.

22. The binder of claim 21 further comprising:

a sheet pocket disposed between said interior and exterior sheets and connected to said interior and exterior sheets in said depressed areas; and a sleeve formed between said interior sheet and said pocket sheet and defined by said depressed areas, an opening being formed in said pocket sheet for the insertion of an instrument in said sleeve.

23. The binder of claim 21 wherein said depressed areas are of varying depth.

* * * * *

UNITED STATES PATENT AND TRADEMARK OFFICE

CERTIFICATE OF CORRECTION

PATENT NO. : 4,630,843

DATED : December 23, 1986

INVENTOR(S) : Boyd Willat

It is certified that error appears in the above-identified patent and that said Letters Patent is hereby corrected as shown below:

In column 5, line 20, delete "pages" and insert therefor -- papers --.

In column 6, line 1, delete "said".

In column 6, line 42, delete "said".

In column 7, line 5, delete "said".

In column 8, line 7, delete "said".

Signed and Sealed this

Twenty-eighth Day of April, 1987

*Attest:*

DONALD J. QUIGG

*Attesting Officer*

*Commissioner of Patents and Trademarks*